Patented Jan. 9, 1940

2,186,629

UNITED STATES PATENT OFFICE 2,186,629

PROCESS OF DYEING

Joseph B. Dickey, Rochester, N. Y., assignor to Eastman Kodak Company, Rochester, N. Y., a corporation of New Jersey No Drawing. Application October 26, 1938, Serial No. 237,063

10 Claims. (Cl. 8—50)

This invention relates to the art of dyeing or coloring. More particularly, it relates to the dyeing of organic derivatives of cellulose with a non-sulfonated aromatic azo dye compound containing a sulfazone nucleus.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed organic acid esters of cellulose, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate and the cellulose ethers, such as methyl cellulose, ethyl cellulose or benzyl cellulose.

It is an object of my invention to provide a new process for the dyeing of organic derivatives of cellulose.

A further object of my invention is to provide dyed textile materials made of or containing an organic derivative of cellulose which are of good fastness to light. Other objects will hereinafter appear.

For purposes of clarification, it is here noted that sulfazone is subject to tautomerism and apparently may exist in any one of three forms represented by the following formulae:

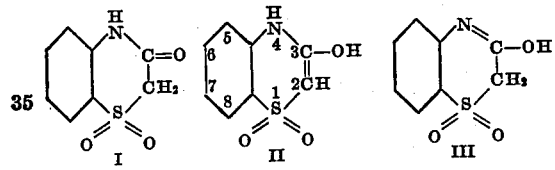

(see Berichte der Deutschen Chemischen Gesellschaft, vol. 45, page 747). Whenever sulfazone or a sulfazone compound is structurally represented herein, the form shown in Formula II will be employed although it will be understood that so far as the present invention is concerned the three forms are synonymous and the exact form in which the sulfazone compound actually exists is immaterial. Formula II, as used hereinafter, then, is symbolic of sulfazone regardless of its exact tautomeric form or forms in any given case. Similarly, the numbering shown above is that which will be employed throughout. Coupling, ordinarily, is believed to take place in the 2-position of the sulfazone nucleus although it may, under certain conditions, occur in the 6-position.

The azo dye compounds employed in the process of my invention have the general formula:

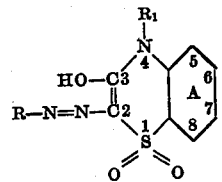

IV wherein R represents the residue of a non-sulfonated aromatic nucleus, $R_1$ represents hydrogen or an alkyl group and A means that the benzene nucleus so designated may be substituted. Advantageously, R is an aryl nucleus of the benzene series.

The aromatic azo dye compounds employed in the process of my invention can be prepared by diazotizing an aromatic amine and coupling the diazonium compound formed with a sulfazone. The preparation of said azo dye compounds will be clear from the examples given hereinafter illustrating their preparation.

In order that the preparation of the azo dye compounds employed in the process of my invention may be clearly understood, sulfazone and certain of its derivatives may be prepared as described in the article beginning at page 749, vol. 45 of Berichte der Deutschen Chemischen Gesellschaft and in the article beginning at page 350, vol. 49 of this same journal. By "a sulfazone derivative" or "a sulfazone compound" is meant sulfazone or sulfazone substituted in its benzene nucleus with a monovalent substituent such as the chlorine atom, the bromine atom, an amino group, a nitro group or an alkyl group. Substituents, such as those mentioned, may be introduced into the benzene nucleus of sulfazone by methods customary for the introduction of such substituents into a benzene nucleus. The introduction of certain of these substituent groups is shown in the Berichte articles just referred to. Similarly, as seen from Formula IV, compounds wherein the nitrogen atom in the 4-position of the sulfazone nucleus is substituted with an alkyl group, are included within the meaning of "a sulfazone derivative" or "a sulfazone compound." This alkyl substituent, as well as the alkyl substituent which may be present in the benzene nucleus of sulfazone, may be, for example, a methyl group, an ethyl group, a propyl group or a substituted alkyl group such as hydroxyethyl.

I am aware that the preparation of aromatic azo compounds containing a sulfazone nucleus is disclosed in the Berichte der Deutschen Chemischen Gesellschaft articles to which reference has been previously made. Further, these articles state that cotton may be dyed with certain of the azo dyes disclosed and also that wool may be dyed with certain of said azo dyes. However, there is no teaching in these articles or in the prior art of which I am aware that non-sulfonated aromatic azo dye compounds containing a sulfazone nucleus can be employed to dye organic derivatives of cellulose such as cellulose acetate silk. Again, it will be noted, no claim is made herein to aromatic azo dye compounds containing a sulfazone nucleus. According to the process of my invention, organic derivatives of cellulose such as those hereinbefore mentioned may be colored greenish-yellow, yellow, orange-yellow, orange, orange red and red shades of good fastness to light and washing. The invention is particularly adapted to the dyeing of textile materials made of or containing an organic derivative of cellulose and especially cellulose acetate silk.

The following examples illustrate the preparation of the azo dye compounds employed in the process of my invention.

EXAMPLE 1

12.3 grams of o-anisidine are dissolved in 100 cc. of water to which has been added 25 cc. of 36% hydrochloric acid. The resulting solution is cooled to a temperature approximating 0–5° C. by the addition of ice, for example, and the o-anisidine is diazotized while maintaining this temperature by adding, with stirring, 6.9 grams of sodium nitrite dissolved in water.

19.7 grams of sulfazone are dissolved in 200 cc. of water containing 8 grams of sodium hydroxide. The resulting solution is cooled to a temperature approximating 0–10° C. by the addition of ice and the diazonium compound prepared as described above is slowly added with stirring. Upon completion of the coupling reaction which takes place the mixture is made acid to Congo red paper by the addition of hydrochloric acid and the dye compound formed is recovered by filtration, washed with water and dried. The dye compound obtained has the probable formula:

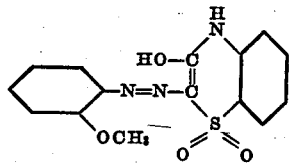

and colors cellulose acetate silk a greenish-yellow shade of good light fastness.

EXAMPLE 2

13.8 grams of p-nitroaniline are diazotized in accordance with the method described in Example 1 and the diazonium compound obtained is coupled with 24.2 grams of 7-nitrosulfazone. The coupling reaction and recovery of the dye compound may be carried out as described in Example 1. The dye compound obtained has the probable formula:

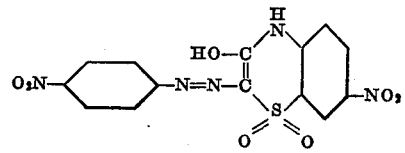

and colors cellulose acetate silk an orange-yellow shade of good light fastness.

EXAMPLE 3

19.7 grams of p-aminoazobenzene are diazotized in known fashion and coupled with 19.7 grams of sulfazone dissolved in 200 cc. of water containing 30 grams of sodium carbonate. The dye compound obtained in accordance with this example has the probable formula:

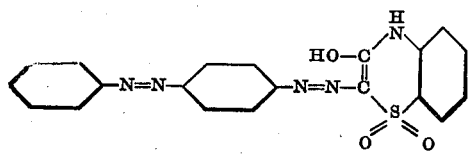

and colors cellulose acetate silk an orange shade.

EXAMPLE 4

17.3 grams of 1-amino-2-nitro-4-chlorobenzene are diazotized in known fashion and the diazonium compound obtained is coupled in a dilute sodium carbonate solution with 25.6 grams of 4-methyl-7-nitrosulfazone. The coupling reaction and recovery of the dye compound may be carried out in accordance with the method described in Example 1. The dye compound obtained colors cellulose acetate silk a golden yellow shade from an aqueous suspension of the dye.

Equivalent weights of 4-$\beta,\gamma$-hydroxypropyl-8-chloro-sulfazone and 4-$\beta$-hydroxyethyl-8-nitro-sulfazone, for example, may be substituted for the 4-methyl-7-nitrosulfazone of the example to obtain dye compounds which may be employed in the process of my invention.

The following tabulation further illustrates the compounds employed in the process of my invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 4, inclusive.

| Amine | Coupling component | Color on cellulose acetate silk |
|---|---|---|
| p-Nitroaniline | Sulfazone | Orange-yellow. |
| p-Aminoacetophenone | do | Yellow. |
| o-Bromoaniline | do | Do. |
| 1-amino-2-bromo-4-nitrobenzene | do | Orange. |
| 1-amino-2-nitro-4-chlorobenzene | do | Orange-yellow. |
| 1-amino-2,4-dinitro-6-chlorobenzene | do | Red. |
| 1-amino-2-ethoxy-4-nitrobenzene | do | Orange. |
| 1-amino-2-chloro-4-methylbenzene | do | Yellow. |
| p-Nitroaniline | 7-methyl sulfazone | Do. |
| Do | 6-chlorosulfazone | Do. |
| p-Aminoacetophenone | 4-$\beta$-hydroxyethylsulfazone | Do. |

In carrying out the process of my invention, the non-sulfonated aromatic azo dye compounds employed in the process will ordinarily be applied to the organic derivative of cellulose material in the form of an aqueous suspension which can be prepared by grinding the dye to a paste in the presence of a sulfonated oil, soap or other suitable dispersing agent and dispersing the resulting paste in water. Dyeing operations can, with advantage be conducted at a temperature of 80–85° C. but any suitable temperature may be used. In accordance with the usual dyeing practice, the material to be dyed will ordinarily be added to the aqueous dyebath at a temperature lower than that at which the main portion of the dyeing is to be effected; a temperature approximating 45–55° C., for example, following which the temperature of the dyebath will be raised to that selected for carrying out the dyeing operation. The temperature at which the dyeing is conducted will vary somewhat depending, for example, on the particular organic derivative of cellulose or mixture of an organic derivative of cellulose and other material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that my process of dyeing includes coloration by printing and stencilling as well as coloration by strictly dyeing methods.

Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose monoacetate diphthalate, for example, the sodium, potassium or ammonium salts, and sulfonated oleic, stearic or palmitic acid, or salts thereof, such, for example, as the sodium or ammonium salts.

My invention will be illustrated more particularly in connection with the dyeing of cellulose acetate silk but it will be clearly understood that my invention is not limited to the dyeing of this particular material. The following examples illustrate how dyeing may be carried out in accordance with my invention. Quantities are expressed in part by weight.

*Example A*

2.5 parts of the dye compound prepared by coupling diazotized p-nitroaniline with sulfazone are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored an orange-yellow shade of good fastness to light.

*Example B*

2.5 parts of the dye compound of Example 1 are substituted for the dye compound of Example A and dyeing is carried out as described in Example A. The cellulose acetate silk is colored a greenish-yellow shade of good fastness to light.

While my invention, as above noted, has been illustrated in connection with the dyeing of cellulose acetate silk textile materials it will be understood that dyeing operations can be carried out in a manner similar to that described above by the substitution of another organic derivative of cellulose material for cellulose acetate silk or by employing dye compounds other than those employed in the examples or by substitution of both the material being dyed and the dye compounds of the examples.

I claim:

1. The process of dyeing material made of or containing an organic derivative of cellulose which comprises applying thereto a non-sulfonated azo dye compound having the general formula:

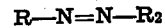

wherein R represents the residue of an aryl nucleus of the benzene series and R₂ represents the residue of a sulfazone nucleus which is joined through the carbon atom in the 2-position to the azo bond.

2. The process of dyeing material made of or containing an organic acid ester of cellulose which comprises applying thereto a non-sulfonated azo dye compound having the general formula:

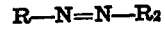

wherein R represents the residue of an aryl nucleus of the benzene series and R₂ represents the residue of a sulfazone nucleus which is joined through the carbon atom in the 2-position to the azo bond.

3. The process of dyeing material made of or containing a cellulose acetate which comprises applying thereto a non-sulfonated azo dye compound having the general formula:

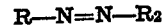

wherein R represents the residue of an aryl nucleus of the benzene series and R₂ represents the residue of a sulfazone nucleus which is joined through the carbon atom in the 2-position to the azo bond.

4. The process of dyeing material made of or containing a cellulose acetate which comprises applying thereto a non-sulfonated azo dye compound having the general formula:

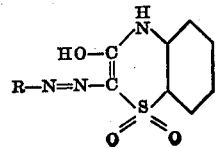

wherein R represents the residue of an aryl nucleus of the benzene series.

5. Material made of or containing an organic derivative of cellulose dyed with a non-sulfonated azo dye compound having the general formula:

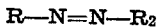

wherein R represents the residue of an aryl nucleus of the benzene series and R₂ represents the residue of a sulfazone nucleus which is joined through the carbon atom in the 2-position to the azo bond.

6. A cellulose acetate dyed with a non-sulfonated azo dye compound having the general formula:

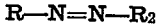

wherein R represents the residue of an aryl nucleus of the benzene series and R₂ represents the residue of a sulfazone nucleus which is joined through the carbon atom in the 2-position to the azo bond.

7. A cellulose acetate dyed with a non-sulfonated azo dye compound having the general formula:

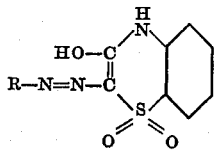

wherein R represents the residue of an aryl nucleus of the benzene series.

8. Material made of or containing an organic derivative of cellulose dyed with a non-sulfonated azo dye compound having the general formula:

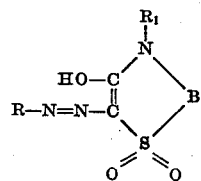

wherein R represents the residue of an aryl nucleus of the benzene series, R₁ represents a member selected from the group consisting of hydrogen and an alkyl group and B represents an aryl nucleus of the benzene series containing but one benzene nucleus attached through adjacent carbon atoms to the nitrogen and sulfur atoms shown.

9. Material made of or containing an organic acid ester of cellulose dyed with a non-sulfonated azo dye compound having the general formula:

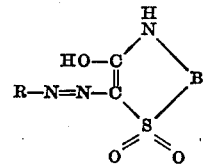

wherein R represents the residue of an aryl nucleus of the benzene series and B represents an aryl nucleus of the benzene series containing but one benzene nucleus attached through adjacent carbon atoms to the nitrogen and sulfur atoms shown.

10. A cellulose acetate dyed with a non-sulfonated azo dye compound having the general formula:

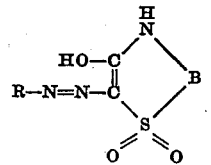

wherein R represents the residue of an aryl nucleus of the benzene series and B represents an aryl nucleus of the benzene series containing but one benzene nucleus attached through adjacent carbon atoms to the nitrogen and sulfur atoms shown.

JOSEPH B. DICKEY.